May 26, 1964 W. E. MESH 3,134,246
SHAFT COUPLING
Filed Dec. 21, 1961

DRIVER SHAFT

DRIVEN SHAFT

INVENTOR
WILLIAM E. MESH

BY Ralph R. Barnard
ATTORNEY

United States Patent Office 3,134,246
Patented May 26, 1964

3,134,246
SHAFT COUPLING
William E. Mesh, Nichols, N.Y., assignor to International Business Machines Corporation, New York, N.Y., a corporation of New York
Filed Dec. 21, 1961, Ser. No. 161,127
3 Claims. (Cl. 64—30)

This invention relates to a shaft coupling and more particularly to a new and improved low power shaft coupling.

The coupling of a driver shaft to a driven shaft has been the practical requirement in mechanical design for centuries. In some cases, the shaft coupling is designed to transmit considerable power between the driver and the driven member. In other cases, the shaft coupling is desired to transmit a small amount of power and at the same time minimize weight, space and cost of construction. One field where the latter conditions are present is in control system instrumentation. In the control system instrumentation field, it is also desirable to have a relatively small low power shaft coupling, which when subjected to a torque overloading will slip and break the coupling of the shafts.

There are many shaft couplings available on the market in both the large power and low power categories of varied constructions. However, the cost of a reliable low power shaft coupling has remained relatively high, when it is important that the weight and volume of coupling be minimized. Prior to the present invention, there still was a need for a low power shaft coupling which was of low cost, simple construction, relatively low volume and weight while at the same time providing a reliable overload decoupling feature.

It is, therefore, a primary object of the present invention to provide a new and improved low power shaft coupling.

It is another object of the present invention to provide a new and improved shaft coupling of simple construction and low cost.

It is an additional object of the present invention to provide a new and improved low power shaft coupling which is of minimum weight and volume.

It is still another object of the present invention to provide a new and improved low power shaft coupling which will slip at a selected overloading torque.

The aforementioned objects are obtained by constructing a shaft coupling of plural friction segments mechanically cooperating with the driven and driver shafts and held in position by at least one circular spring member associated with each shaft. The force from the resilient circular spring members acts to create a friction coupling between the segments and each shaft. The torque at which the coupling starts to slip is determined by the tension of one of more of the resilient spring members.

The foregoing and other objects, features and advantages of the invention will be apparent from the following more particular description of preferred embodiments of the invention, as illustrated in the accompanying drawings:

Figure 1:
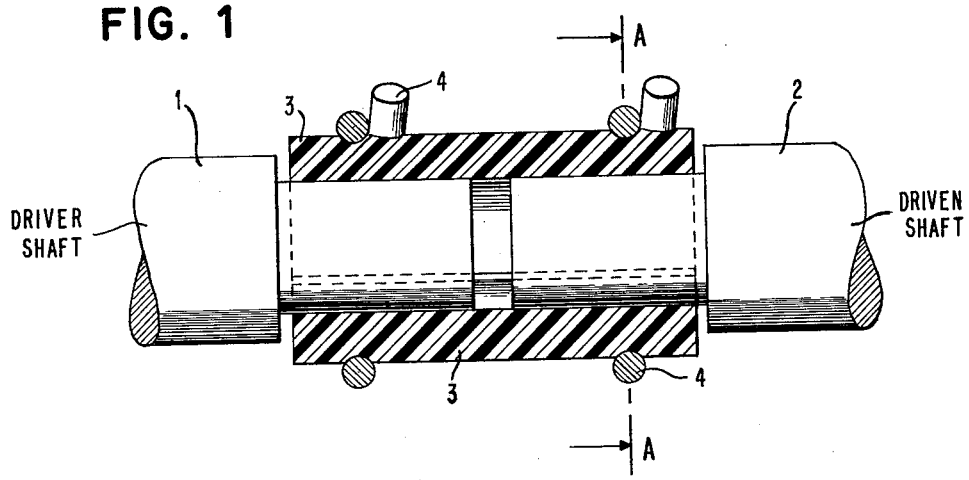
FIG. 1 shows two shafts coupled by a clutch constructed according to the teachings of the present invention.

Referring to FIG. 1, shaft 1 is shown as the driver shaft and shaft 2 is shown as the driven shaft. Moreover, plural friction segments 3 having an inside surface shaped in the manner of a cylindrical sleeve cut in longitudinal sections are shown extending over and cooperating with each of shafts 1 and 2. The radius of this inside surface should be substantially the same as the radius of the shafts 1 and 2. Because the segments 3 are shaped in a manner as sections of a sleeve, maximum friction contact is made with the circular cross-sections of shafts 1 and 2. The pressure with which segments 3 are held in contact with the outside cylindrical surfaces of shafts 1 and 2 is determined by the resiliency and bias of the circular spring members 4. While only two circular spring members are shown, one cooperating with the friction segments 3 and shaft 1 and the other cooperating with the friction segments 3 and shaft 2, it should be clear that the plural circular spring members may be utilized as desired. The total friction coupling is determined by the friction coefficient of the segment material and the force applied thereto by the spring members.

With respect to simplicity, it should be clear that only two unique parts make up the shaft coupling, the friction segments and the spring member. Furthermore, it should be noted that neither one of these parts need be constructed with high tolerance. The following materials are examples of those materials which may be used for the construction of the friction segments: rigid fiber materials; plastic materials such as Bakelite alone or in combination with fillers such as asbestos and metallic particles; flexible materials such as rubber, synthetic rubbers over a range of hardness and flexibility.

The following materials are reprsentative of materials which may be used to construct the resilient spring member: spring steel, stainless steel, Phosphor bronze in round or ribbon form.

The torque at which the coupling will begin to slip on either the driver shaft or driven shaft can be changed by changing the tension on one or more circular spring members. Since the friction segments 3 need not be made of completely rigid type material, it should be recognized that the shaft coupling can be relatively unaffected by a vibration environment which would cause small temporary misalignments of the shafts 1 and 2. Moreover, the driver shaft 1 and driven shaft 2 need not be initially lined up with a very high degree of accuracy when the shaft coupling constructed in accordance with the teachings of the present invention is utilized.

When the friction material selected for segment 3 is relatively nonrigid, spring members 4 will sink into the friction material as shown in FIG. 1. The rigidity of the segment material will be a matter of choice depending upon the particular application and other designed considerations. However, if it is desired that the spring members 4 be effectively notched into the segments so that there will be no slippage of the spring members along the longitudinal axis of the shaft, special notches may be cut in the sleeve.

A principal advantage in the use of plural segments according to the present invention, instead of a cylinder-shaped internal surface, as did the prior art to provide the friction coupling, is that there are no problems connected with assuring that the initial inside diameter is substantially equal to the diameter of the shaft and maintaining that inside diameter, which may change as a result of wear due to slippage and the passage of time. When segments are used, the selection of the proper radius is not nearly as critical. While three segments 3 are shown and may be an optimum number in many instances, it should be clear that more segments could be utilized based upon the practical considerations of a particular coupling design.

Generally, however, it would not be desirable to utilize a large number of segments.

One feature which may be considered when practicing the teachings of the present invention is to leave sufficient clearance between the ends of shafts 1 and 2 which are to be coupled so that the spring members 4 may be inserted and arranged around the shafts. This will eliminate the need of temporarily bending the springs to assemble the shaft coupling. While each of the shafts 1 and 2 is shown as being undercut over the length of the coupling for the purpose of limiting any undesired axial movement of the segments 3, it should be clear that other techniques could be used for that purpose. For example, each of the segments could contain on its inside surface a projection which would register with the space between the ends of shafts 1 and 2 to be coupled.

Figure 3:
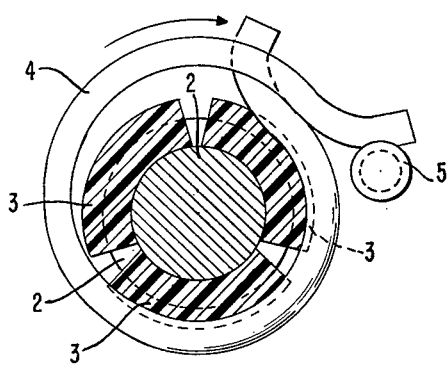
FIG. 3 shows one of the resilient circular spring members of FIG. 1 cooperating with a mechanical stop to initiate slipage of the shaft coupling.

FIG. 3 illustrates how one or more of the spring members 4 may at particular angles of rotational position cooperate with a mechanical stop 5 so that the pressure or tension applied to the segments by the spring member is relieved and the coupling between the driver and driven shafts is broken. As shown, the mechanical stop cooperates with the protruding end of the spring member to achieve this result.

Figure 2:
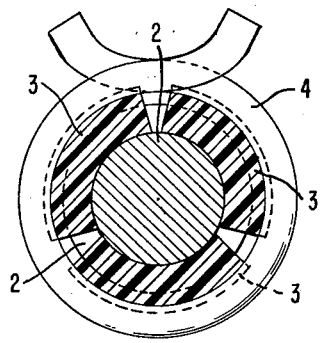
FIG. 2 shows a cross-section of FIG. 1 in the plane AA.
Figure 4:
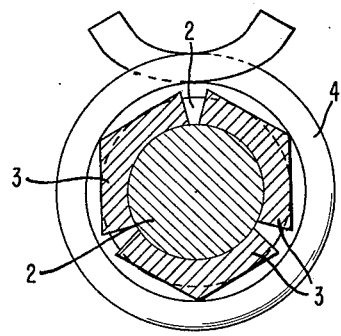
FIG. 4 shows a cross-section similar to FIG. 2 where the shape of the relatively rigid friction segments provide for a uniform distribution of forces.

Referring now to FIG. 4, there is shown a cross-section similar to FIG. 2 where the shape of the friction segments is specially selected to provide for a uniform distribution of forces applied to said segments in spite of irregularities in the shape of the spring members 4 and consequent non-uniform application of forces. The embodiment of FIG. 4 would, as a general rule, utilize a relatively rigid friction segment material. FIG. 4 illustrates that the shape of the friction segments other than the inside surface may be modified in accordance with the practical application of the teachings of the present invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A shaft coupling for coupling a driver shaft and a driven shaft comprising plural friction segments each having an inside surface shaped to conform to said driver and driven shafts to be coupled, and separate plural resilient circular springs cooperating with said plural friction segments to connect said driver and driven shafts, said spring members including ring portions having inner surfaces engaging the outer surfaces of said friction segments to resiliently force said segments into frictional engagement with said shafts.

2. In combination with a driven shaft and a driver shaft, each of said shafts having a cylindrical end section, the end sections of each of said shafts being placed in close proximity with their longitudinal axis in approximate alignment, coupling means comprising at least three friction segments each having an inside surface shaped in a manner of a cylindrical sleeve cut in longitudinal sections, said friction segments being placed in contact with the cylindrical surface of both the driven and driver shafts, at least one separate circular spring member holding said friction segments against the cylindrical surface of said driver shaft, and at least one separate circular spring member holding said friction segments against the cylindrical surface of said driven shaft, each of said spring members including a ring portion surrounding the friction segments and having an inner surface engaging the friction segments to resiliently force them into frictional engagement with the cylindrical surface of the associated shaft.

3. Coupling means for drivingly connecting a driver shaft with a driven shaft comprising at least three friction segments each extending axially between the driver and driven shafts and engaging both the driver and driven shafts, and a plurality of spring means, at least one associated with each of the driver and the driven shafts each said spring means including a ring portion surrounding the associated shaft and the friction segments engaged therewith, said ring portion engaging the outer surfaces of said friction segments and resiliently forcing them into frictional engagement with the associated shaft.

References Cited in the file of this patent

UNITED STATES PATENTS

| 1,847,882 | Lorig | Mar. 1, 1932 |
| 2,685,719 | Golden | Aug. 10, 1954 |